United States Patent [19]

Nierenberg

[11] 4,323,755
[45] Apr. 6, 1982

[54] METHOD OF MAKING A MACHINE-READABLE MARKING IN A WORKPIECE

[75] Inventor: Morton J. Nierenberg, Lancaster, Pa.

[73] Assignee: RCA Corporation, New York, N.Y.

[21] Appl. No.: 77,915

[22] Filed: Sep. 24, 1979

[51] Int. Cl.³ .................. B23K 26/08; G01D 15/14
[52] U.S. Cl. .................. 219/121 LJ; 219/121 LA; 219/121 LR; 219/121 LY; 209/3.3; 346/76 L
[58] Field of Search ..... 219/121 L, 121 LA, 121 LB, 219/121 LH, 121 LJ, 121 LM, 121 LP, 121 LR, 121 LY, 121 EJ, 121 EK; 356/369; 209/3.3; 346/76 L

[56] References Cited

U.S. PATENT DOCUMENTS

| | | | |
|---|---|---|---|
| 3,325,819 | 6/1967 | Fraser | 219/121 L |
| 3,436,510 | 4/1969 | Fyler | 219/121 EJ X |
| 3,803,637 | 4/1974 | Martin et al. | 346/76 L |
| 3,898,417 | 8/1975 | Atkinson | 219/121 LJ X |
| 4,031,351 | 6/1977 | Martin . | |
| 4,032,861 | 6/1977 | Rothrock . | |
| 4,122,240 | 10/1978 | Banas et al. . | |

OTHER PUBLICATIONS

*IEEE Spectrum*, May 1979, p. 42–49; "Lasers in the Factory" Roger Allan, Associate Editor.
*Optics and Laser Technology*, Dec. 1973, vol. 5, No. 6, p. 256–265; "Printing of Part Numbers Using a High Power Laser Beam" by G. Holzinger, K. Kosanke and W. Menz.
IBM Technical Disclosure Bulletin, vol. 14, No. 9, Feb. 1972, p. 2641–2642; "Optical System for Laser Machining of Thin Slots" by M. Grimm.
*Journal of Applied Physics*; vol. 45, No. 11, Nov. 1974, p. 4964–4968; "Fabrication of Channel Optical Waveguides in Glass by C. W. Laser Heating", by T. Pavlopoulos and K. Crabtree.
D. Meyerhofer, "Machining with the Carbon Dioxide Laser" *RCA Engineer* 15 (1970), p. 52–57.

*Primary Examiner*—B. Dobeck
*Assistant Examiner*—Keith E. George
*Attorney, Agent, or Firm*—E. M. Whitacre; G. H. Bruestle; L. Greenspan

[57] ABSTRACT

A method for producing a machine-readable coded marking in the surface of a workpiece comprising vaporizing sequentially the surface portions of selected ones of a series of contiguous areas of unit widths of the surface.

4 Claims, 4 Drawing Figures

METHOD OF MAKING A MACHINE-READABLE MARKING IN A WORKPIECE

BACKGROUND OF THE INVENTION

This invention relates to a novel method for producing a machine-readable coded marking in a surface of a workpiece.

U.S. Patent Application Ser. No. 041,091 filed May 21, 1979 by W. R. Miller describes an improved method for assembling parts for a CRT (cathode-ray tube) including providing at least one tube part, such as the glass faceplate, which has a unique machine-readable coded marking, such as a bar-code marking, on an external surface thereof. This marking is read one or more times by machine during the manufacturing of the tube. Each time it is read, a control signal is generated in response to the reading, and then the signal is used to initiate a local process for action with respect to the tube part. The local process may be one or more of selecting and assembling another part to the workpiece, a series of processing steps applied to the workpiece, a recording of a historical record, etc. The marking must be made reliably at low cost, must be readable reliably and at low cost and must survive the hostile environments of subsequent processing.

U.S. Patent Application Ser. No. 041,092 filed May 21, 1979 by P. M. Heyman discloses an improved workpiece which carries a machine-readable coded marking abraded into the surface of the workpiece. Also disclosed is a novel method whereby these abraded markings can be made on demand at relatively low cost and at relatively high rates of speed. Since the marking is abraded into the workpiece, it has substantially the same resistance to hostile environments as the workpiece itself. The abraded portions of the marking and the nonbraded portions therebetween have substantially different reflectances so that they can be read with commercial bar-code readers at low cost.

It is desirable to provide an alternative method for producing on demand a unique machine-readable coded marking in the surface of a workpiece, particularly one which, with the advance of technology may produce a better marking at lower cost.

SUMMARY OF THE INVENTION

The novel method for producing a machine-readable coded marking in a surface of a workpiece, which may be of glass, comprises (1) targeting a series of contiguous strip-like areas of unit widths on said surface, and (2) vaporizing the surface portions of selected ones of said areas according to a prearranged program related to the markings. The marking comprises a plurality of related marks, such as a bar-code marking, which have substantially different optical properties, such as different light reflectances, than the intervening surfaces. Such marking satisfies all the above-mentioned desired characteristics of low cost and high reliability. It has substantially the same resistance to thermal and chemical treatments as the workpiece itself.

The preferred form of the novel method comprises (a) providing means for vaporizing in less than $10^{-4}$ second a defined area of the workpiece surface with an incident beam of radiant energy, (b) causing substantially continuous relative motion between said beam and said surface, and (c), during step (b), either activating the vaporizing means or deactivating the vaporizing means according to a program, representing specific identifying information, synchronized with said substantially continuous relative motion. The resultant marking is a related sequence of marks, preferably substantially parallel bars, of predetermined unit and multiple-unit widths and spacings, vaporized from the surface. By employing the described vaporizing means synchronized to be activated and deactivated with the continuous relative motion between the beam of the vaporizing means and the surface to be marked, the marking produced has all of the above-mentioned characteristics and can be made in a factory environment, on demand at low cost.

DETAILED DESCRIPTION

Figure 1:
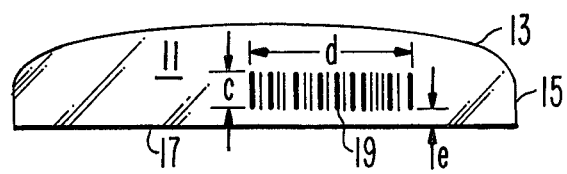
FIG. 1 is an elevational view of a glass faceplate panel for a CRT carrying a bar-code marking prepared according to the novel method.

FIG. 1 illustrates a typical glass faceplate panel 11 to be used as part of the envelope of a color television picture tube. The panel 11 includes a rectangular viewing window 13 and an integral sidewall 15 around the window 13. The sidewall 15 has a panel seal land 17 at the distal end thereof. A machine-readable coded marking 19 in the external surface of the sidewall 15 is produced by vaporizing material therefrom. The marking 19 comprises a related sequence of substantially parallel bars of predetermined unit and multiple-unit widths and spacings, which are popularly referred to as a bar-code marking. Any of the codes used for bar-code marking may be used on the panel 11. In this specific embodiment, the marking 19 uses the interleaved two-of-five code which employs vaporized bars of one-unit and three-unit widths and nonvaporized spaces therebetween of one-unit and three-unit widths. Since bar codes are described in detail elsewhere, no further description of the code itself is necessary.

Figure 2:
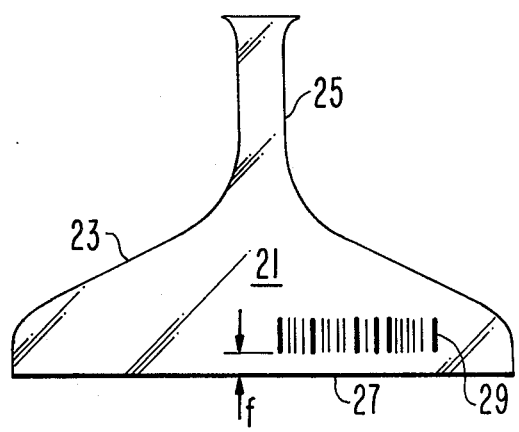
FIG. 2 is an elevational view of a glass funnel for a CRT carrying a bar-code marking prepared according to the novel method.

FIG. 2 is a typical glass funnel 21 to be used as part of the envelope of a color television picture tube. The funnel includes a cone 23, a neck 25 integral with the narrow end of the cone 23 and a funnel seal land 27 at the wide end of the cone 23. A machine-readable coded marking 29 as described above for the panel 11 is applied by vaporizing material from the external surface of the cone 23 near the wide end of the cone 23.

In both FIGS. 1 and 2, the markings 19 and 29 may be placed anywhere on the workpieces. However, for making and reading the markings automatically by machine, it is important that the markings be placed at locations that are easily located and accessed. As shown in FIG. 1, the panel marking 19 and the marks thereof are a distance c, typically about 19 mm (0.75 inch) high, and the marking is a distance d, typically about 76.2 mm (3.00 inches) wide. The closest edge of the panel marking 19 is a distance e, typically about 19 mm (0.75 inch), away from the seal land 17 with the bars of the marking 19 extending in a direction about normal to the surface of the seal land 17. The vaporized marks are either about 0.6 mm (0.025 inch) or about 1.9 mm (0.075 inch)

wide. The marking 19 includes a central portion with specific identifying information, typically about 63.5 mm (2.50 inches) wide, and end portions about 6.4 mm (0.25 inch) wide at each end of the central identifying-information portion for signalling a machine reader the "start" and the "stop" of the marking. The funnel marking 29 on the funnel 21 shown in FIG. 2 is similar to the above-described panel marking 19 and is located a distance f, typically about 19 mm (0.75 inch), from the funnel seal land 27. During subsequent processing, the panel 11 and the funnel 21 may be joined together at their respective seal lands by methods known in the art. The markings 19 and 29 are not degraded during the common first-sealing method which employs temperatures of more than 400° C.

The panel 11 (FIG. 1) and the funnel 21 (FIG. 2) are typical glass workpieces carrying markings which were made by the novel method. The novel vaporization method may be used to produce similar markings on the external surfaces of organic or inorganic nonmetallic material or a combination of materials of other workpieces or combinations of workpieces. For example, plastics, glass, ceramics, particulate crystalline and noncrystalline materials and combinations thereof are markable by the novel method. Unlike prior bar-code markings, the marking in the novel article is produced by vaporizing material from the surface of the workpiece. Thus, the marking and the workpiece itself have substantially the same characteristics with respect to the ambient present during subsequent processing. There is no degradable label, or printing ink or intermediate adhesive film for a label present which could limit the utility of the marking.

The vaporized areas of the marking have a different reflecting characteristic from the nonvaporized areas therebetween. In a glass surface, the vaporized marks of the marking appear as areas of greater reflectivity because the vaporization changes the specular nature of the surface to a more diffuse one. For reading the marking by machine, with the light source, the marked surface and the detector arranged to put the detector off the specular angle, then the light scattered into the detector will be greater from the vaporized areas than from the nonvaporized areas. In other structures, the vaporized areas may have greater light absorption and therefore appear darker than the intervening nonvaporized areas. These markings may be read also by detecting the difference in reflectivity of the surface in the specular angle. It is this difference which allows the marking to be read by a process including optically detecting the light reflection or the light scattering from the marked surface.

Two devices that may be used to read these markings are a laser scanner and a television camera. With a lasser scanner, a light beam is scanned across the marked surface whereby the reflected light is modulated by the occurrence of vaporized or nonvaporized areas. With a television camera, either ambient light or a fixed light source provides the required illumination to activate the photosensitive surfaces in relation to the vaporized or nonvaporized areas of the marking. The markings may be read with a commercially-available reader at intervals during and after the assembly of the workpiece into an assembled end product. A typical reader is described in U.S. Pat. No. 3,801,182 to P. W. Jones in which a polarized light beam scans across the marking in a direction normal to the length of the bars. The reflected light is sensed and converted to electrical signals representative of the marking, which signals are then decoded and used for some useful purpose, such as the control of a manufacturing process or the compulation of historical data.

Vaporization, unlike cutting, incising and engraving, does not put significant sharply-defined grooves in the surface. Sharply-defined grooves may weaken a glass workpiece when it is stressed. Also, vaporization is to be distinguished from etching, which requires a chemical reaction which is slow and is difficult to work with. Vaporization involves thermal action principally. Vaporization of selected areas of the surface can be carried out with a beam of radiant energy with high controlled energy density over a defined area. In the novel method, the defined area corresponds substantially in size and shape to the narrowest mark in the marking. Vaporization is believed to be superior to other methods for altering the optical characteristics of a surface of a workpiece in the reliability and durability of the marking and in the ease and low cost with which it can be produced by machine.

To improve the contrast between the vaporized and nonvaporized areas of the marking, a thin coating of a contrasting material may be produced in the area to be marked, and then the marks or bars are vaporized through the coating. For example, a white coating comprising a mixture of white titanium dioxide particles and a sodium silicate binder or a devitrifying glass frit may be painted or sprayed on the surface area of interest of a glass workpiece. Then, the marks are vaporized through the white coating according to the novel method. Then, the marked coating is heated to integrate the marked coating into the glass support by fusing it thereto. A further improvement in contrast can be achieved by providing a black undercoating between the white coating and the glass support. For example, a mixture of black manganese dioxide and sodium silicate binder is painted or sprayed on a glass support. Then, the white coating described above is coated over the undercoating. Then the marks are vaporized from the white coating according to the novel method. Then the marked coating is heated to integrate the coating and undercoating into the glass support.

Vaporized markings such as are shown at 19 (FIG. 1) and 29 (FIG. 2) can be produced by any suitable process using masked radiant energy for vaporization and with any apparatus that can suitably define and locate the marks of the marking with a mask. A preformed template or stencil on the surface of the workpiece to define all of marks of the marking simultaneously, in combination with a means to vaporize the exposed surface with a beam of radiant energy, may be used, but such a process is slow, cumbersome and relatively expensive.

Figure 3:
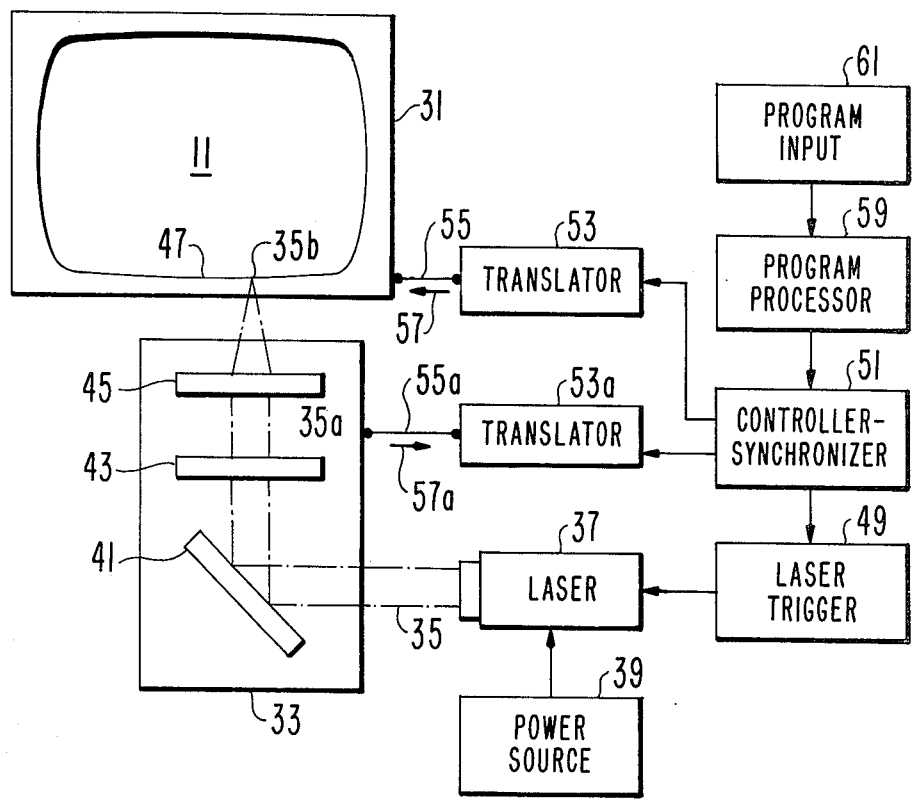
FIG. 3 is a plan view of an apparatus for practicing the novel method.

FIG. 3 shows an apparatus with which a vaporized marking can be made rapidly and cheaply on demand by producing the marks on the marking sequentially. The apparatus comprises a workpiece table 31 and a stage 33 which can be moved one with respect to the other. In this embodiment, the stage 33 is stationary and the table 31 is adapted for controlled translational movement with respect to the stage 33. The panel 11 of FIG. 1, but shown from above, is positioned on the table 31 with the seal land 17 against the table surface and the window 13 facing upwardly. The stage 33 carries the optical components for processing the output laser beam 35 of a laser 37, which is powered from an electrical power source 39. The output beam 35 is reflected about 90° by a mirror 41, upon a mask 43. The mask 43 comprises a solid metal sheet having a rectangular hole therethrough. The hole size is related to the size of the narrowest bar of the bar code to be produced in that the hole has the same height but is considerably wider than the narrowest mark. As shown in both FIGS. 3 and 4, a beam 35a of about the shape and size of the hole in the mark 43 passes to a converger 45 which converges the beam 35a incident upon the surface 47 of the panel 11 to be marked. The converged beam at the surface 47 irradiates an area 35b about the size of the narrowest mark or bar of the bar code to be produced. Thus, the converger 45 converges the beam only in its width and not in its height. The convergence is significant in that, before convergence, the beam 35a is of such radiant power density as to be nondestructive of the mask 43. But, upon convergence at the area 35b of incidence with the surface 47, the radiant power density of the beam is increased such that it will vaporize material from the surface 47 without causing substantial melting thereof.

The laser 37 is normally on but does not produce an output beam unless triggered with a laser trigger 49. When triggered, the laser 37 emits a single beam pulse of about $10^{-8}$ to $10^{-4}$ second duration. In one embodiment, the laser 37 is a commercially-available carbon-dioxide laser, such as a Lasermark Model 920 marketed by Lasermark, Kanata, Ontario, Canada whose output beam has a wavelength of about 10,600 nanometers and a power density of about 0.75 to 0.86 joule per square centimeter (4.8 to 5.7 joules per square inch) and a beam cross section about 3.0 cm by 2.5 cm (centimeters). The power output is adjustable over a finite range so that the converged beam incident on the surface 47 produces a desired mark at lowest power density by vaporization and without substantial melting of the surface material.

Figure 4:
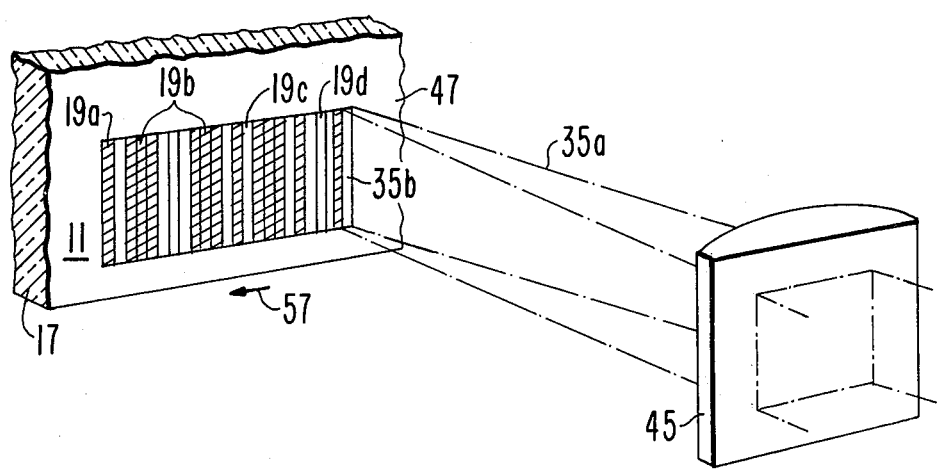
FIG. 4 is a perspective view of a glass surface being marked by a laser beam according to the novel method.

In this one embodiment, the hole in the mask 45 passes a beam 35a about 2.5 centimeters by 2.5 centimeters in cross section. This beam is then converged by a cylindrical lens in the converger 45 to the area 35b about 2.5 cm high by about 0.64 mm (0.025 inch) wide. As shown in FIG. 4, the glass surface 47 moves continuously in the direction of the arrow 57 with respect to the path of the beam 35a. By programmed triggering of the laser 37, single unit 19a, and triple unit 19b, marks are vaporized from the surface. Also, single-unit 19c and triple-unit 19d spaces are left unvaporized.

The laster trigger is of the capacitive discharge type as is known in the art. The laser trigger 49 is controlled from a controller-synchronizer 51, which also controls a mechanical translator 53. The translator 53 is mechanically connected by a link 55 to the table 31. Alternatively, a translator 53a can be connected by a link 55a to the stage 33; or both transistors 53 and 53a can be connected by the links 55 and 55a to the table 31 and the stage 33 respectively. The controller-synchronizer provides signals to the translator 53 to move the table 31 (in this embodiment) and/or the stage 33 (in other embodiments) at a substantially continuous linear controlled rate in a direction parallel to the width of the bars to be made as indicated by the arrow 57 (or 57a). In this embodiment, the translator 53 uses a stepping motor which provides 1,000 steps per 2.54 cm (one inch) or about 25 steps per unit width in the marking to be made. The controller-synchronizer 51 also provides signals to the laser trigger 49 after each time interval required for the table 31 (and/or the stage 33) to travel one unit bar width; that is, after each 25 steps of the stepping motor. Each signal passed to the trigger 49 either triggers the laser to emit a pulse of radiant energy or to not emit, according to a program provided through a program processor 59 from a program input 61. Thus, the programmed pulse output of the laser 37 and the relative movement of that output with respect to the surface 47 to be marked are synchronized to target every unit bar width area in a series of contiguous strip-like or bar-like areas, and to vaporize selected ones of those areas according to a prearranged program. Since the area of the pulsed beam at incidence on the surface 47 is a unit bar width and the areas are in a contiguous series, one can produce unit and multiple-unit bar widths and unit and multiple-unit spaces for the complete marking.

The program input 61 can be manual as from a keyboard, or it can be preplanned series of numbers which can be input by machine, as by reading a magnetic tape memory for the numbers stored there. The program processor 59 converts the input information into a form that can be handled by the controller-synchronizer 51 and may have the capability of storing a limited amount of the processed information. The processed information in the form of electrical signals is fed to the controller-synchronizer 51 where it is used to control the translator 53 and the laser trigger 49 in order to synchronize the movement of the surface to be marked and the triggering of the incident beam.

By providing automatic workpiece loading and unloading means for the table 31 and the electronically programmed controller-synchronizer 51, markings can be made easily, reliably and cheaply on successive workpieces. To increase the marking rate, several laser beams may be used simultaneously, each beam having its own laser trigger. The several m laser beams translate along the marking width d as a unit, with each beam being separated from its nearest neighbor by a distance d/n. Thus, each of the several beams is responsible for vaporizing only 1/n of the entire marking.

I claim:

1. A method for producing a machine-readable coded marking in a surface of a workpiece comprising:
    (1) targetting a series of contiguous, substantially parallel strip-like areas of unit widths on said surface,
    (2) and vaporizing simultaneously all of the surface portions of each of selected ones of said areas with radiant energy according to a prearranged program related to said marking, some of said selected areas being contiguous.

2. The method for producing a machine-readable coded marking in a nonmetallic surface of a workpiece defined in claim 1 comprising:
    (a) providing means for selectively vaporizing in less than $10^{-4}$ seconds a defined area of said surface with a beam of radiant energy incident on said area,
    (b) causing substantially continuous relative motion between said beam and said surface in such manner as to target sequentially a series of said contiguous substantially parallel, strip-like areas of unit widths on said surface,
    (c) and activating said vaporizing means in pulses of less than $10^{-4}$ seconds duration according to a program, said pulses and said relative motion being synchronized so as to vaporize only selected ones of a plurality of said areas in said series.

3. A method for producing a machine-readable marking on a nonmetallic surface of a workpiece, said marking comprising a plurality of parallel bars of unit and multiple-unit widths and unit and multiple-unit spaces, said method comprising:

(a) providing means for selectively heating said surface over a substantially rectangular area of a predetermined length and said unit width with a high energy density beam of radiant energy to a surface vaporization temperature within a time period of about $10^{-4}$ and $10^{-8}$ seconds, (b) causing substantially continuous relative linear motion between said surface and said beam, and parallel to the width of said beam in such manner as to target sequentially a series of contiguous substantially parallel, strip-like areas of unit widths on said surface, (c) and activating said heating means in pulses of less than $10^{-4}$ seconds duration according to a prearranged program to vaporize simultaneously all of the surface portions of each of selected ones of said targetted areas, said pulses and said relative motion being synchronized to produce a series of unit and multiple-unit vaporized areas and unit and multiple-unit spaces therebetween.

4. The method defined in claim 3 including directing a laser beam of radiant energy with relatively low energy density on a stencil, said stencil being outside the means for generating said beam, said stencil permitting the transmission of a laser beam of generally rectangular shape and of relatively low energy density, and converging said shaped laser beam in only one direction to have said high energy density and said substantially unit width when said converged beam is incident upon said surface.

* * * * *